United States Patent [19]
Shirk et al.

[11] Patent Number: 6,116,642
[45] Date of Patent: Sep. 12, 2000

[54] INFLATOR FOR INFLATING AN INFLATABLE VEHICLE OCCUPANT PROTECTION DEVICE

[75] Inventors: Bryan W. Shirk, Mesa; Jess A. Cuevas, Scottsdale; Ahmad K. Al-Amin, Higley; Timothy A. Swann; Roy D. Van Wynsberghe, both of Mesa; Dean M. Esterberg, Tempe, all of Ariz.

[73] Assignee: TRW Inc., Lyndhurst, Ohio

[21] Appl. No.: 09/067,289

[22] Filed: Apr. 27, 1998

[51] Int. Cl.$^7$ .................................................. B60R 21/26
[52] U.S. Cl. ............................................. 280/737; 280/736
[58] Field of Search ................................ 280/736, 737, 280/741, 742; 102/530, 531

[56] References Cited

U.S. PATENT DOCUMENTS

| | | |
|---|---|---|
| 4,817,828 | 4/1989 | Goetz . |
| 4,902,036 | 2/1990 | Zander et al. . |
| 5,106,119 | 4/1992 | Swann et al. . |
| 5,621,183 | 4/1997 | Bailey . |
| 5,632,505 | 5/1997 | Saccone et al. . |
| 5,803,494 | 9/1998 | Headley .................................. 280/741 |
| 5,813,694 | 9/1998 | Jeong ....................................... 280/737 |
| 5,826,904 | 10/1998 | Ellis et al. ............................... 280/737 |
| 5,857,699 | 1/1999 | Rink et al. ............................... 280/737 |

*Primary Examiner*—Paul N. Dickson
*Assistant Examiner*—Faye M. Fleming
*Attorney, Agent, or Firm*—Tarolli, Sundheim, Covell, Tummino & Szabo L.L.P.

[57] ABSTRACT

An actuatable inflator (10) for inflating an inflatable vehicle occupant protection device (12) includes a container (70) having a cup-shaped wall including a base portion (72) and a side wall portion (74). The container (70) is a one-piece structure. The base portion (72) and the side wall portion (74) at least partially define a combustion chamber (84) in the container (70). An ignitable material (110) in the combustion chamber (84), when ignited, rapidly increases the fluid pressure inside the combustion chamber. An electrically actuatable initiator (112) ignites the ignitable material (110). The base portion (72) of the cup-shaped wall includes a predefined rupture portion (90). The rupture portion (90) ruptures when the fluid pressure inside the combustion chamber (84) reaches a predetermined elevated fluid pressure level to form an orifice (120) through which the inflation fluid in the combustion chamber flows. The orifice (120) controls the rate at which the inflation fluid flows into the inflatable vehicle occupant protection device (12).

15 Claims, 3 Drawing Sheets

Fig.1

INFLATOR FOR INFLATING AN INFLATABLE VEHICLE OCCUPANT PROTECTION DEVICE

TECHNICAL FIELD

The present invention relates to an actuatable inflator for inflating an inflatable vehicle occupant protection device.

BACKGROUND OF THE INVENTION

It is known to protect a vehicle occupant with an inflatable protection device, such as an air bag, that is inflated in the event of sudden vehicle deceleration such as occurs in a vehicle collision. The air bag helps to protect the vehicle occupant by restraining the movement of the occupant during the collision. The air bag is inflated by inflation fluid which is provided by an air bag inflator. The inflation fluid may be stored gas which is released from the inflator and/or gas generated by the ignition of combustible gas generating material in the inflator. Typically, an electrically actuatable, pyrotechnic initiator is triggered by a collision sensor in the vehicle to initiate the release of the stored gas and/or the ignition of the gas generating material.

In applications where the inflation fluid is produced by combustible gas generating material, it can be desirable to delay the release of inflation fluid into the air bag to ensure a more complete combustion of the gas generating material. It can also be desirable to control the rate at which the inflation fluid flows into the air bag.

SUMMARY OF THE INVENTION

The present invention is an actuatable inflator for inflating an inflatable vehicle occupant protection device. The inflator comprises a container having a cup-shaped wall including a base portion and a side wall portion. The cup-shaped wall comprises a one-piece structure. The base portion and the side wall portion at least partially define a combustion chamber in the container. An ignitable material in the combustion chamber, when ignited, rapidly increases the fluid pressure inside the combustion chamber. An electrically actuatable initiator ignites the ignitable material. The base portion of the cup-shaped wall includes a predefined rupture portion that ruptures when the fluid pressure inside the combustion chamber reaches a predetermined elevated fluid pressure level to form an orifice through which the inflation fluid in the combustion chamber flows. The orifice controls the rate at which the inflation fluid flows into the inflatable vehicle occupant protection device.

The base portion of the cup-shaped wall of the container is movable between an initial condition and a deformed condition upon ignition of the ignitable material. The base portion forms an arcuate dome in the deformed condition. The orifice is centrally located in the arcuate dome.

The inflator further comprises a diffuser member defining a diffusing chamber encircling the container. The container is welded to the diffuser member to seal the combustion chamber. The diffuser member has a plurality of outlet openings through which the inflation fluid flows to inflate the inflatable vehicle occupant protection device.

In accordance with a first embodiment of the present invention, the predefined rupture portion in the base portion of the cup-shaped wall of the container defines a pivotable section having an approximately ¾ circle configuration. The pivotable section comprises an arcuate depression in the base portion of the cup-shaped wall. The orifice formed by the rupturing of the rupture portion according to the first embodiment is defined by a partially cylindrical surface portion and a planar surface portion of the base portion.

In accordance with a second embodiment of the present invention, the predefined rupture portion in the base portion of the cup-shaped wall of the container defines a pivotable section having an approximately ¾ circle configuration. The predefined rupture portion comprises a V-shaped groove formed in an inner surface of the base portion of the cup-shaped wall and extending in a C-shaped pattern. The inner surface partially defines the combustion chamber. The orifice formed by the rupturing of the rupture portion according to the second embodiment is defined by a partially cylindrical surface portion and a planar surface portion of the base portion of the cup-shaped wall.

In accordance with a third embodiment of the present invention, the predefined rupture portion of the base portion of the cup-shaped wall comprises a V-shaped groove extending in an X-shaped pattern and dividing the rupture portion into four petal-like sections. The V-shaped groove is formed in an inner surface of the base portion of the cup-shaped wall, which inner surface partially defines the combustion chamber. The orifice formed by the rupturing of the rupture portion according to the third embodiment is generally square in shape.

BRIEF DESCRIPTION OF THE DRAWINGS

The foregoing and other features of the present invention will becomes apparent to one skilled in the art to which the present invention relates upon reading the following description of the invention with reference to the accompanying drawings, wherein.

DESCRIPTION OF PREFERRED EMBODIMENTS

The present invention relates to an actuatable inflator for inflating an inflatable vehicle occupant protection device.

Figure 1:
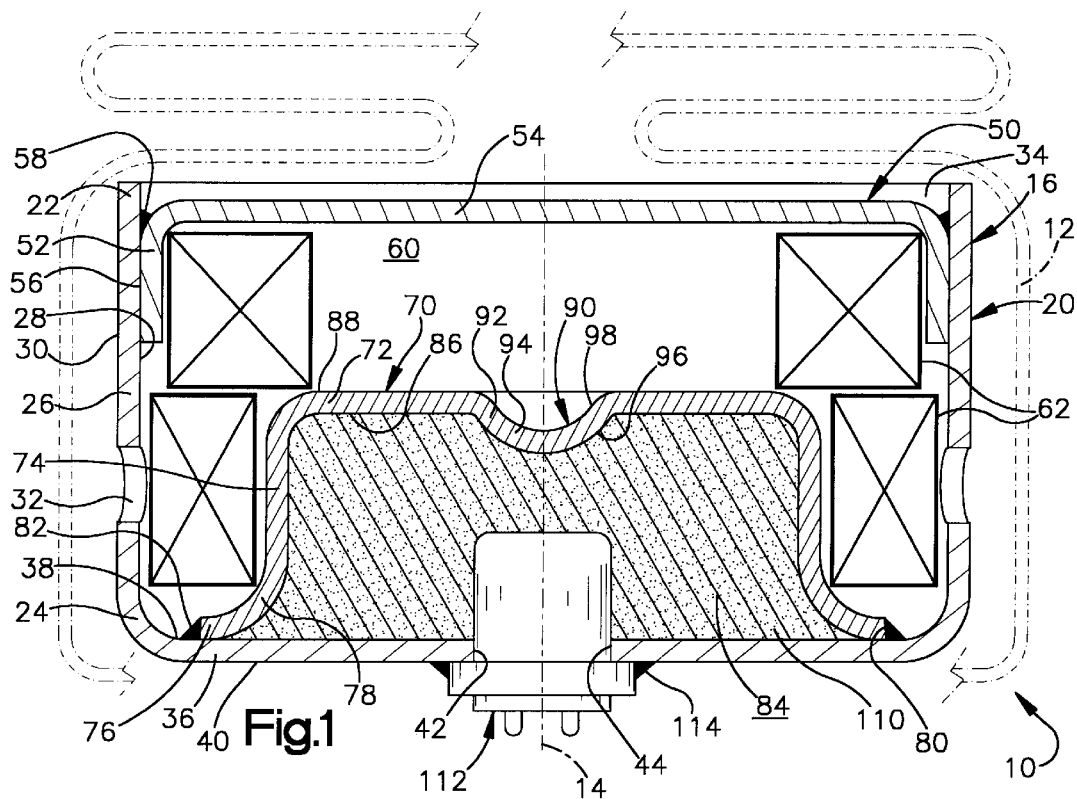
FIG. 1 is a schematic sectional view of a first embodiment of an actuatable inflator for inflating an inflatable vehicle occupant protection device constructed in accordance with the present invention, the inflator being shown in an unactuated condition.

The present invention is applicable to inflatable vehicle occupant protection devices of various constructions such as inflatable air bags, inflatable seat belts, inflatable knee bolsters and knee bolsters operated by inflatable air bags, inflatable head liners, and inflatable side curtains. As representative of the present invention, FIG. 1 schematically illustrates an inflator 10 for inflating an inflatable air bag 12 (shown in phantom lines in FIGS. 1 and 2).

The inflator 10 is centered on an axis 14 and includes a housing 16. The housing 16 is made of two parts, namely, a diffuser cup 20 and a cover 50. Both the diffuser cup 20 and the cover 50 are made of a metal, preferably stainless steel.

The diffuser cup 20 is cup-shaped and is centered on the axis 14. The diffuser cup 20 has axially opposite first and second end portions 22 and 24, respectively, connected by a main body portion 26. The main body portion 26 has parallel cylindrical inner and outer surfaces 28 and 30, respectively. The main body portion 26 includes a circumferentially spaced plurality of gas outlet openings 32 extending between the cylindrical inner and outer surfaces 28 and 30.

The first end portion 22 of the diffuser cup 20 has a first opening 34 defined by the cylindrical inner surface 28 extending from the main body portion 26 of the diffuser cup 20. The second end portion 24 of the diffuser cup 20 includes a radially inwardly directed wall 36. The wall 36 includes an inner surface 38 and an outer surface 40. The wall 36 has an axial surface 42 defining a second opening 44 in the second end portion 24 of the diffuser cup 20. The second opening 44 is centered on the axis 14.

The cover 50 of the housing 16 is centered on the axis 14 and is located in the first end portion 22 of the diffuser cup 20. The cover 50 has a cup shape defined by an axially and circumferentially extending first portion 52 and a radially extending second portion 54. The first portion 52 of the cover 50 has a first outer surface 56 which abuts the cylindrical inner surface 28 of the diffuser cup 20. The cover 50 is attached to the diffuser cup 20 by an annular weld 58 which closes and seals the first end portion 22 of the diffuser cup 20. The cover 50 and the diffuser cup 20 together define a diffusing chamber 60 inside the housing 16. One or more annular filter elements 62 are located in the diffusing chamber 60 as shown schematically in FIG. 1.

The inflator 10 further includes a combustion container 70 centered on the axis 14. The combustion container 70 is located in the diffusing chamber 60 in the housing 16. The combustion container 70 is a one-piece or monolithic part made of a homogeneous metallic material. The combustion container 70 is preferably made of stainless steel by a known reverse draw process.

The combustion container 70 has a general cup shape defined by a radially extending base portion 72 and an axially and circumferentially extending side wall portion 74 which extends from the base portion. The combustion container 70 further includes a radially outwardly directed flange 76 located opposite the base portion 72 of the combustion container. The flange 76 is connected to the side wall portion 74 by an arcuate transition section 78 and terminates in an axial surface 80. The combustion container 70 is attached to the diffuser cup 20 by an annular weld 82 connecting the axial surface 80 of the flange 76 to the inner surface 38 of the wall 36 in the second end portion 24 of the diffuser cup 20.

The base portion 72 and the side wall portion 74 of the combustion container 70 together define a combustion chamber 84 inside the combustion container 70. The base portion 72 of the combustion container 70 includes an inner surface 86 and an outer surface 88. The inner surface 86 faces inside the combustion chamber 84 and partially defines the combustion chamber. The outer surface 88 of the base portion 72 faces away from the combustion chamber 84. In an initial, unactuated condition of the inflator 10 shown in FIG. 1, the inner and outer surfaces 86 and 88 of the base portion 72 are generally planar.

The base portion 72 of the combustion container 70 includes a predefined rupture portion 90 centered on the axis 14. The predefined rupture portion 90 defines a pivotable section 92 in the base portion 72. The pivotable section 92 has an approximately 3/4 circle configuration. The pivotable section 92 comprises an arcuate depression 94 formed in the base portion 72 during the reverse draw manufacturing process of the combustion container 70. The pivotable section 92 has arcuate inner and outer surfaces 96 and 98, respectively, which extend from the generally planar inner and outer surfaces 86 and 88, respectively, of the base portion 70. The outer surface 98 of the pivotable section 92 is concave when the base portion 70 is in the unactuated condition.

The inflator 10 includes a source of inflation fluid contained within the combustion chamber 84. According to the preferred embodiment of the present invention, the source of inflation fluid comprises a solid body of ignitable, combustible gas generating material 110. Such gas generating material is well known in the art of air bag inflators. Alternatively, the source of inflation fluid could comprise a combustible mixture of gases, a combination of a combustible mixture of gases and gas generating material, or a combination of a pressurized inflation fluid and an ignitable material for heating and further pressurizing the inflation fluid.

The inflator further includes an electrically actuatable initiator 112. The initiator 112 is centered on the axis 14 and extends partially through the second opening 44 in the wall 36 at the second end portion 24 of the diffuser cup 20. The initiator 112 is secured to the outer surface 40 of the wall 36 by an annular weld 114. The initiator 112 is of a known construction and is actuatable by one or more collision sensors (not shown) to ignite the gas generating material 110 in the combustion chamber 84.

Upon the occurrence of sudden vehicle deceleration such as occurs in a collision, the initiator 112 is actuated by an electrical signal from a collision sensor in the vehicle. When actuated, the initiator 112 ignites and causes the ignitable gas generating material 110 in the combustion chamber 84 to ignite.

The ignition of the gas generating material 110 rapidly produces a large volume of gas in the combustion chamber 84 which, in turn, causes the pressure inside the combustion chamber to increase rapidly. As the pressure level inside the combustion chamber 84 increases, the base portion 72 of the combustion container 70 deforms from its generally planar initial condition to a deformed, actuated condition (FIG. 2) in which the base portion forms an arcuate dome. The domed shape of the base portion 72 in the deformed condition bows outward away from the initiator 112.

Figure 3:
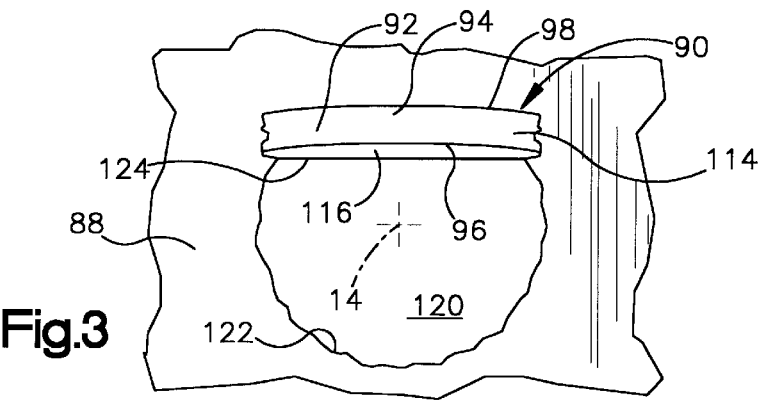
FIG. 3 is an enlarged view taken along line 3—3 in FIG. 2.

When the pressure inside the combustion chamber 84 reaches a predetermined elevated level, the arcuate depression 94 in the base portion 72 of the combustion container 70 also deforms axially. The material of the depression 94 "pops" outward (not shown) away from the initiator 112 so that the shape of the depression changes from concave to convex, as best seen in FIG. 3. The deforming of the depression 94 exercises the material of the base portion 72 and weakens it. This weakening of the material of the depression 94 combined with the force of the pressure inside the combustion chamber 84 causes the depression to rupture along the ¾ circle pattern that defines the depression.

Upon the rupture of the material of the depression 94, the pivotable section 92 of the base portion 72 releases. The pivotable section 92 has a perimeter 114 defined by the ¾ circle outline of the previously present depression in the base portion 72. One quarter of the pivotable section 92 remains connected to the base portion 72 and has a planar shape extending between terminal ends (not shown) of the previously present ¾ circle pattern defining the depression 94. This connected portion of the pivotable section 92 serves as a hinge portion 116 for the pivotable section. The pivotable section 92 pivots outward at the hinge portion 116 away from the combustion chamber 84.

The rupture of the depression 94 and subsequent pivotal movement of the pivotable section 92 forms an orifice 120 in the base portion 72 of the combustion container 70 (FIG. 3). The orifice 120 is centrally located in the domed base portion 72. The orifice 120 is defined by a partially cylindrical surface portion 122 and a planar surface portion 124 of the base portion 72. The partially cylindrical surface portion 122 of the orifice 120 results from the ¾ circle configuration of the rupture in the base portion 72. The planar surface portion 124 of the orifice 120 is located at the hinge portion 116 which connects the pivotable section 92 to the base portion 72. The orifice 120 has a flow area which is smaller than the total flow area of the plurality of gas outlet openings 32 in the diffuser cup 20 and which is the smallest flow area along the gas flow path into the air bag 12.

With the orifice 120 now present in the base portion 72 of the combustion container 70, the gas produced by the gas generating material 110 flows out of the combustion chamber 84 through the orifice. The gas flows through the orifice 120 into the diffusing chamber 60 and is filtered by the filters 62 located in the diffusing chamber. The gas is then directed out of the diffusing chamber 60 and into the air bag 12 through the plurality of gas outlet openings 32 in the main body portion 26 of the diffuser cup 20.

The inflator 10 described above has several advantageous features. The one-piece or monolithic combustion container 70 does not have an exit opening initially present in the combustion container for gas to begin flowing out of the combustion chamber 84 upon ignition of the gas generating material 110. This feature provides a slight delay in the release of gas into the air bag 12 until the predetermined elevated pressure level is reached and the predefined rupture portion 90 ruptures. The delay allows for a more complete and efficient combustion of the gas generating material 110. In addition, the present invention provides for a controlled release of the gas from the inflator 10. The size and shape of the orifice 120 are set by the size and shape of the predetermined rupture portion 90, and the orifice 120 has the smallest flow area in the gas flow path to the air bag 12. The controlled release of the gas from the combustion chamber 84 further ensures a complete and efficient combustion of the gas generating material 110 throughout the entire combustion process. Finally, the inflator 10 uses a small number of parts, only a few welds, and requires a small amount of time to manufacture.

Figure 2:
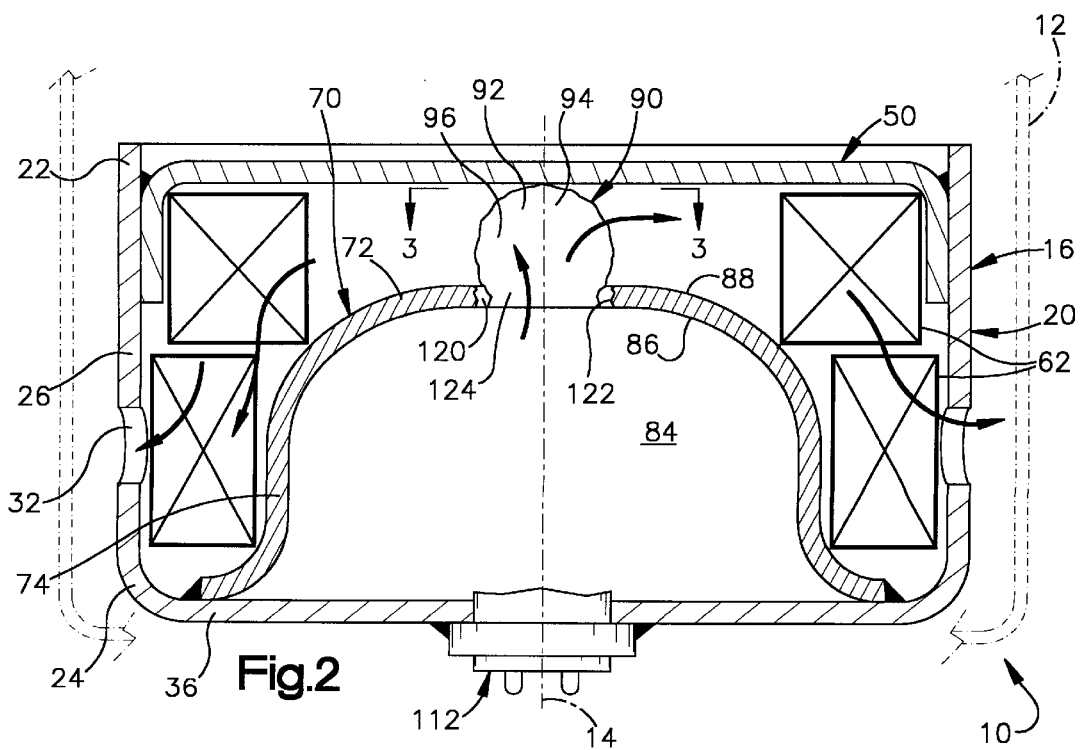
FIG. 2 is a view similar to FIG. 1 showing the inflator in an actuated condition.

FIGS. 4–7 illustrate an inflator 210 constructed according to a second embodiment of the present invention. In FIGS. 4–7, parts of the inflator 210 which are identical to corresponding parts of the inflator 10, shown in FIGS. 1–3, are indicated by the suffix "a". The inflator 210 is similar in construction to the inflator 10 of FIGS. 1–3, except for the predefined rupture portion in the base portion 72a of the combustion container 70a, which is constructed differently.

Figure 4:
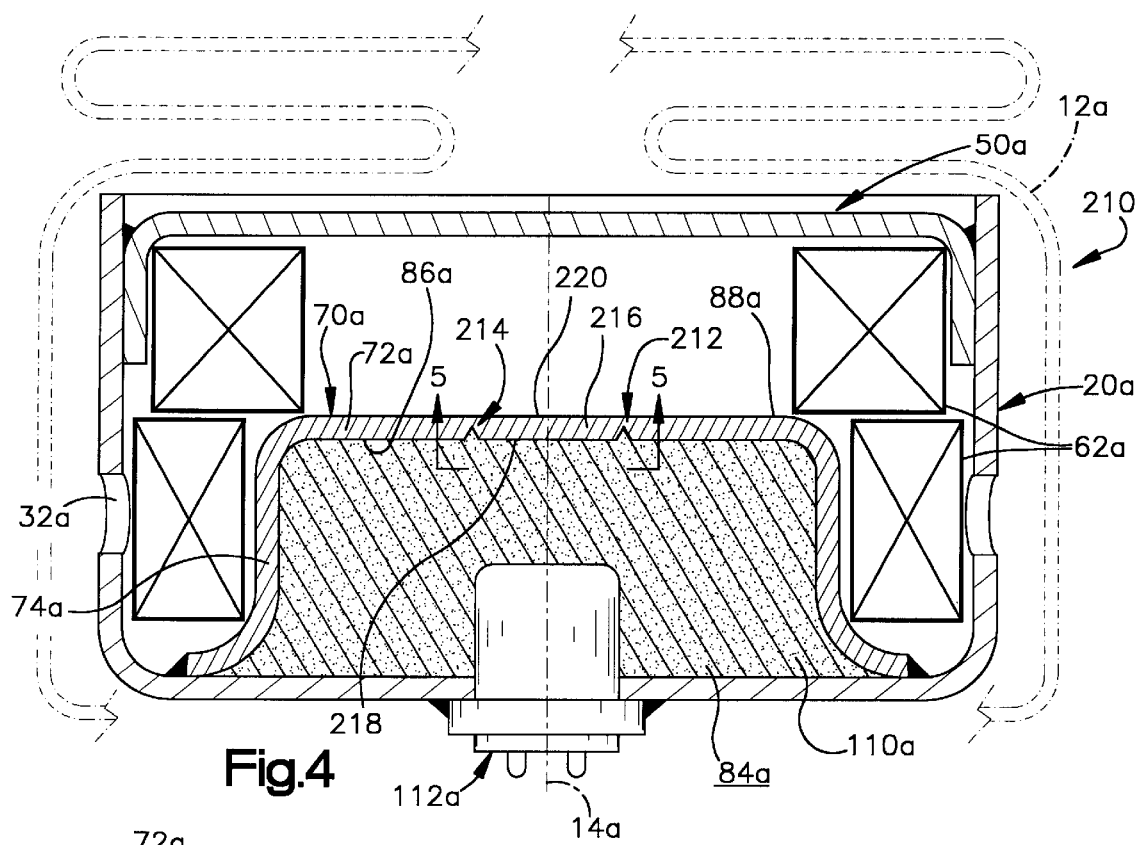
FIG. 4 is a schematic sectional view of an actuatable inflator for inflating an inflatable vehicle occupant protection device constructed in accordance with a second embodiment of the present invention, the inflator being shown in an unactuated condition.
Figure 5:
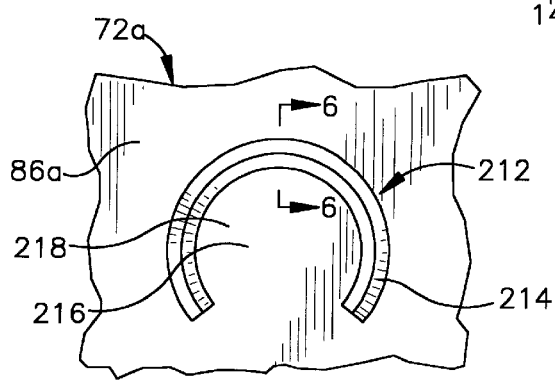
FIG. 5 is an enlarged view taken along line 5—5 in FIG. 4.
Figure 6:
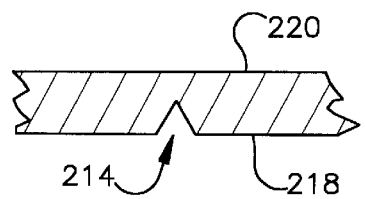
FIG. 6 is a view taken along line 6—6 in FIG. 5.

According to the second embodiment of the invention shown in FIG. 4, a predefined rupture portion 212 in the base portion 72a of the combustion container 70a comprises a V-shaped groove 214 formed in the inner surface 86a of the base portion. The V-shaped groove 214 extends in a C-shaped pattern (FIG. 5) and defines a pivotable section 216 having an approximately ¾ circle configuration. The pivotable section 216 has inner and outer surfaces 218 and 220, respectively, which are co-planar with the inner and outer surfaces 86a and 88a, respectively, of the base portion 72a in the initial, unactuated condition.

Figure 7:
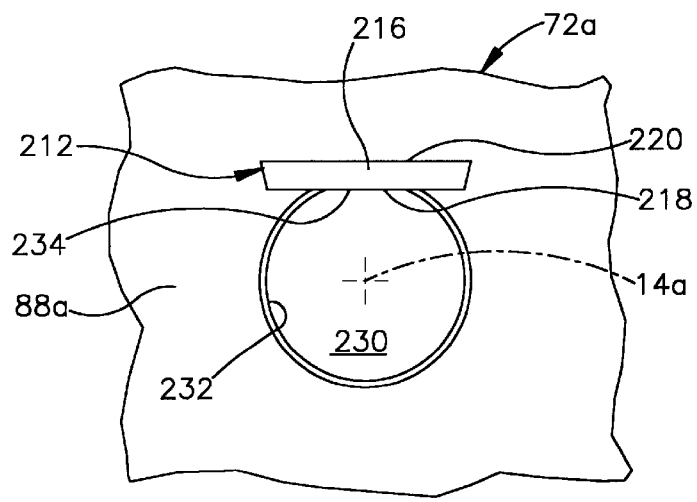
FIG. 7 is an enlarged view similar to FIG. 3 showing the second embodiment of the present invention in an actuated condition.

Upon actuation of the initiator 112a and ignition of combustible gas generating material 110a in the combustion chamber 84a, the base portion 72a deforms to its domed actuated condition as described above regarding the first embodiment. When the pressure in the combustion chamber 84a reaches the predetermined elevated level, the V-shaped groove 214 ruptures and releases the pivotable section 216 for pivotal movement relative to the base portion 72a of the combustion container 70a. The pivotable section 216 pivots outward away from the combustion chamber 84a under the force of the pressure inside the combustion chamber and creates an orifice 230 in the base portion 72a of the combustion container 70a (FIG. 7). Just like the orifice 120 in the first embodiment, the orifice 230 is centrally located in the domed base portion 72a and is defined by a partially cylindrical surface portion 232 and a planar surface portion 234 of the domed base portion.

The gas produced inside the combustion chamber 84a flows through the orifice 230 and is directed into the air bag 12a through the plurality of gas outlet openings 32a in the diffuser cup 20a. The inflator 210 of the second embodiment functions in substantially the same manner as the inflator 10 of the first embodiment and has all of the advantageous features of the inflator of the first embodiment.

Figure 8:
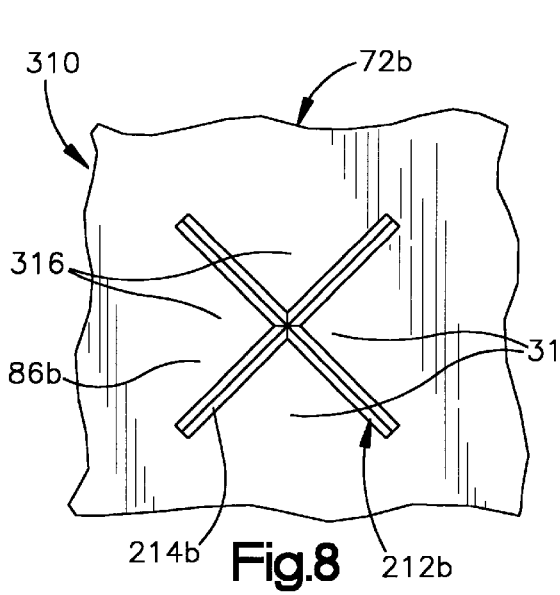
FIG. 8 is a view similar to FIG. 5 illustrating a portion of an actuatable inflator for inflating an inflatable vehicle occupant protection device constructed in accordance with a third embodiment of the present invention, the portion of the inflator illustrated being shown in an unactuated condition.
Figure 9:
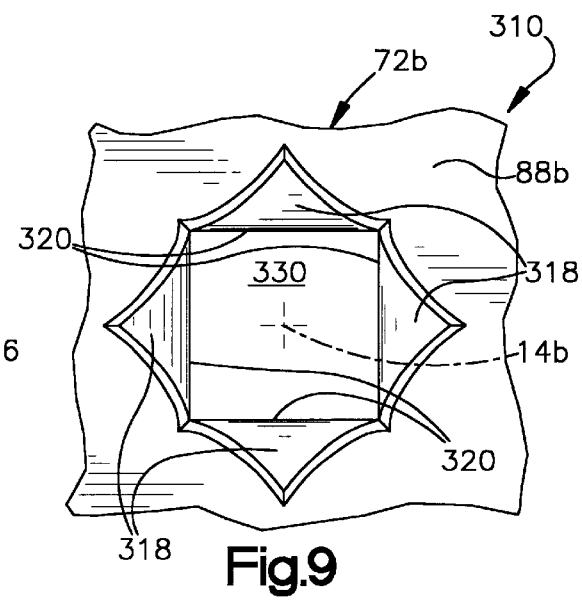
FIG. 9 is a view similar to FIG. 7 showing the third embodiment of the present invention in an actuated condition.

FIGS. 8 and 9 illustrate a portion of an inflator 310 constructed according to a third embodiment of the present invention. In FIGS. 8 and 9, parts of the inflator 310 which are identical to corresponding parts of the inflator 210, shown in FIGS. 4–7, are indicated by the suffix "b". The inflator 310 is similar in construction to the inflator 210 of FIGS. 4–7, except that the predefined rupture portion 212b comprises a V-shaped groove 214b formed in the inner surface 86b of the base portion 72b and extends in an X-shaped pattern (FIG. 8) rather than the C-shaped pattern of the second embodiment.

The X-shaped pattern of the rupture portion 212b divides the rupture portion into four petal-like sections 316. When the V-shaped groove 214b ruptures following actuation of the initiator 112b and combustion of the gas generating material 110b, four pivotable sections 318 are formed. Each of the four sections 318 has a triangular shape and pivots outward away from the combustion chamber 84b at a base portion 320 of each triangular section as shown in FIG. 9. The pivotal movement of the four sections 318 upon rupture of the V-shaped groove 214b creates a square-shaped orifice 330 in the base portion 72b of the combustion container 70b.

The gas produced inside the combustion chamber 84b flows through the square-shaped orifice 330 and is directed into the air bag 12b through the plurality of gas outlet openings 32b in the diffuser cup 20b. The inflator 310 of the third embodiment functions in substantially the same manner as the inflators 10, 210 described in the previous embodiments and has all of the advantageous features of the previous embodiments.

From the above description of the invention, those skilled in the art will perceive improvements, changes and modifications. Such improvements, changes and modifications within the skill of the art are intended to be covered by the appended claims.

Having described the invention, we claim:

1. An inflator for inflating an inflatable vehicle occupant protection device, said inflator comprising:

a container having a cup-shaped wall including a base portion and a side wall portion, said cup-shaped wall comprising a one-piece structure and being initially free of any opening therethrough, said base portion and said side wall portion at least partially defining a combustion chamber in said container, an ignitable material in said combustion chamber, said ignitable material, when ignited, rapidly increasing fluid pressure inside said combustion chamber; and means for igniting said ignitable material, said base portion of said cup-shaped wall including a predefined rupture portion that ruptures when the fluid pressure inside said combustion chamber reaches a predetermined elevated fluid pressure level to form an orifice through which said inflation fluid in said combustion chamber flows, said orifice controlling the rate at which said inflation fluid flows into the inflatable vehicle occupant protection device, wherein said base portion of said cup-shaped side wall of said container is movable between an initial condition and a deformed condition upon ignition of said ignitable material, said base portion forming an arcuate dome in said deformed condition.

2. The inflator of claim 1 wherein said orifice is centrally located in said arcuate dome.

3. An inflator for inflating an inflatable vehicle occupant protection device, said inflator comprising:

a container having a cup-shaped wall including a base portion and a side wall portion, said cup-shaped wall comprising a one-piece structure and being initially free of any opening therethrough, said base portion and said side wall portion at least partially defining a combustion chamber in said container, an ignitable material in said combustion chamber, said ignitable material, when ignited, rapidly increasing fluid pressure inside said combustion chamber; and means for igniting said ignitable material, said base portion of said cup-shaped wall including a predefined rupture portion that ruptures when the fluid pressure inside said combustion chamber reaches a predetermined elevated fluid pressure level to form an orifice through which said inflation fluid in said combustion chamber flows, said orifice controlling the rate at which said inflation fluid flows into the inflatable vehicle occupant protection device, wherein said predefined rupture portion in said base portion of said cup-shaped wall of said container defines a pivotable section having an approximately 3/4 circle configuration.

4. The inflator of claim 3 wherein said pivotable section comprises an arcuate depression in said base portion of said cup-shaped wall.

5. The inflator of claim 3 wherein said predefined rupture portion comprises a V-shaped groove formed in an inner surface of said base portion of said cup-shaped wall and extending in a C-shaped pattern, said inner surface partially defining said combustion chamber.

6. The inflator of claim 3 wherein said orifice formed by the rupturing of said rupture portion is defined by a partially cylindrical surface portion and a planar surface portion of the base portion of said cup-shaped wall.

7. An inflator for inflating an inflatable vehicle occupant protection device, said inflator comprising:

a container having a cup-shaped wall including a base portion and a side wall portion, said cup-shaped wall comprising a one-piece structure and being initially free of any opening therethrough, said base portion and said side wall portion at least partially defining a combustion chamber in said container, an ignitable material in said combustion chamber, said ignitable material, when ignited, rapidly increasing fluid pressure inside said combustion chamber; and means for igniting said ignitable material, said base portion of said cup-shaped wall including a predefined rupture portion that ruptures when the fluid pressure inside said combustion chamber reaches a predetermined elevated fluid pressure level to form an orifice through which said inflation fluid in said combustion chamber flows, said orifice controlling the rate at which said inflation fluid flows into the inflatable vehicle occupant protection device, wherein said predefined rupture portion of said base portion of said cup-shaped wall comprises a V-shaped groove extending in an X-shaped pattern and dividing said rupture portion into four petal-like sections.

8. The inflator of claim 7 wherein said V-shaped groove is formed in an inner surface of said base portion of said cup-shaped wall, said inner surface partially defining said combustion chamber.

9. The inflator of claim 7 wherein said orifice formed by the rupturing of the rupture portion is generally square in shape.

10. An inflator for inflating an inflatable vehicle occupant protection device, said inflator comprising:

a container having a wall defining a combustion chamber, said wall comprising a monolithic structure and being initially free of any opening therethrough;

an ignitable material in said combustion chamber, said ignitable material, when ignited, rapidly increasing fluid pressure inside said combustion chamber; and means for igniting said ignitable material, said wall including a predefined rupture portion that ruptures when the fluid pressure inside said combustion chamber reaches a predetermined elevated fluid pressure level, said rupture portion defining a section of said wall which pivots relative to the remainder of said wall to form an orifice through which said inflation fluid in said combustion chamber flows, said orifice controlling the rate at which said inflation fluid flows into the inflatable vehicle occupant protection device, wherein a portion of said wall of said container is movable between an initial condition and a deformed condition upon ignition of said ignitable material, said portion forming an arcuate dome in said deformed condition.

11. The inflator of claim 10 wherein said orifice is centrally located in said arcuate dome.

12. An inflator for inflating an inflatable vehicle occupant protection device, said inflator comprising:

a container having a wall defining a combustion chamber, said wall comprising a monolithic structure and being initially free of any opening therethrough;

an ignitable material in said combustion chamber, said ignitable material, when ignited, rapidly increasing fluid pressure inside said combustion chamber; and means for igniting said ignitable material, said wall including a predefined rupture portion that ruptures when the fluid pressure inside said combustion chamber reaches a predetermined elevated fluid pressure level, said rupture portion defining a section of said wall which pivots relative to the remainder of said wall to form an orifice through which said inflation fluid in said combustion chamber flows, said orifice controlling the rate at which said inflation fluid flows into the inflatable vehicle occupant protection device, wherein said section defined in said predefined rupture portion has an approximately ¾ circle configuration.

13. The inflator of claim 12 wherein said section comprises an arcuate depression in a base portion of said wall.

14. The inflator of claim 12 wherein said predefined rupture portion comprises a V-shaped groove formed in an inner surface of said wall and extending in a C-shaped pattern, said inner surface partially defining said combustion chamber.

15. An inflator for inflating an inflatable vehicle occupant protection device, said inflator comprising:

a container having a wall defining a combustion chamber, said wall comprising a monolithic structure and being initially free of any opening therethrough;

an ignitable material in said combustion chamber, said ignitable material, when ignited, rapidly increasing fluid pressure inside said combustion chamber; and means for igniting said ignitable material, said wall including a predefined rupture portion that ruptures when the fluid pressure inside said combustion chamber reaches a predetermined elevated fluid pressure level, said rupture portion defining a section of said wall which pivots relative to the remainder of said wall to form an orifice through which said inflation fluid in said combustion chamber flows, said orifice controlling the rate at which said inflation fluid flows into the inflatable vehicle occupant protection device, wherein said predefined rupture portion of said wall comprises a V-shaped groove extending in an X-shaped pattern and dividing said rupture portion into four petal-like sections.

* * * * *